No. 737,625. Patented September 1, 1903.

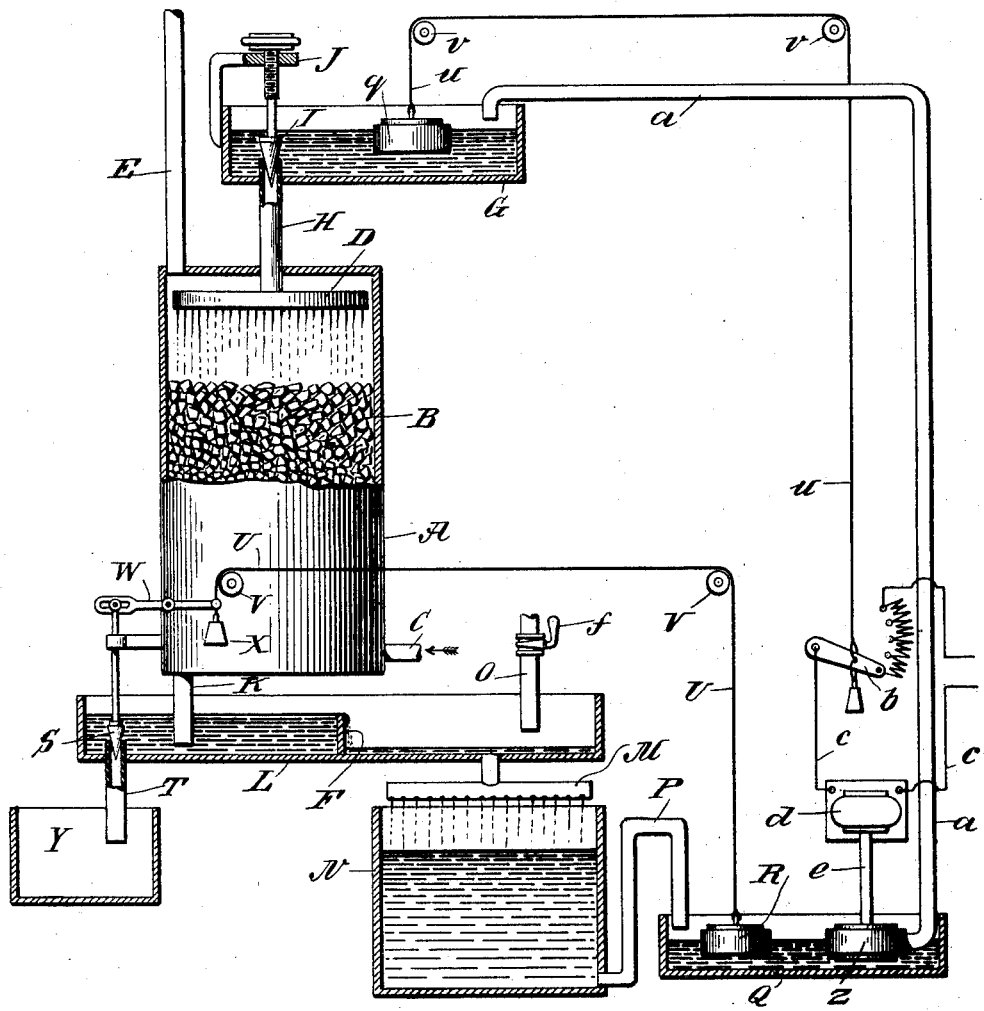

UNITED STATES PATENT OFFICE.

JOHN B. FRANCIS HERRESHOFF, OF NEW YORK, N. Y., ASSIGNOR TO GENERAL CHEMICAL COMPANY, OF NEW YORK, N. Y., A CORPORATION OF NEW YORK.

PROCESS OF MAKING SULFURIC ACID.

SPECIFICATION forming part of Letters Patent No. 737,625, dated September 1, 1903.

Application filed May 7, 1903. Serial No. 156,022. (No specimens.)

*To all whom it may concern:*

Be it known that I, JOHN B. FRANCIS HERRESHOFF, a citizen of the United States, and a resident of the borough of Manhattan, city, county, and State of New York, have invented certain new and useful Improvements in Processes of Making Sulfuric Acid, of which the following is a specification.

My invention relates to the manufacture of sulfuric acid by the absorption of sulfuric anhydrid through the medium of liquid sulfuric acid of a lower density than that to be finally produced.

The object of my invention is to provide a continuous process of great efficiency, in which provision will be made automatically for supplying the proper amount of absorbing liquid acid.

A plant suitable for carrying out my invention is shown in the accompanying drawing, which is a diagrammatic elevation with parts in section.

A indicates the absorbing-tower filled with coke or irregular pieces of other material, as designated at B. At C, I have indicated an inlet located at the bottom of the absorption-tower and into which the sulfuric anhydrid mixture produced in any suitable manner is introduced in gaseous form. In the upper part of the tower A, I locate a spraying or distributing device D, through which the liquid acid is discharged in the shape of numerous jets to trickle down over the coke or other material B and to absorb the anhydrid which travels in the opposite direction. The anhydrid is forced through the absorption-tower in the usual way.

E is a pipe for the exit of the unabsorbed gases, consisting, chiefly, of nitrogen and oxygen; but it will be understood that the sulfuric anhydrid is absorbed practically in its entirety.

The liquid sulfuric acid which is to absorb the anhydrid is supplied from a tank G, which is connected with the distributing device D by a pipe H. An inlet-valve I or equivalent device controls the speed with which the liquid acid passes into the absorption-tower. This inlet-valve, as shown, has a stem which screws into a stationary bracket J, so that the valve may be adjusted manually.

The strong acid which results from the absorption of the anhydrid by the liquid acid trickling over the material B is discharged through a pipe K into a tank L. This tank is divided into two compartments by a partition F, which is of less height than the walls of the tank, so that the acid discharged into one of said compartments by the pipe K will after filling said compartment overflow into the other compartment. This other compartment is connected with a manifold or other suitable distributing device M, arranged to discharge the liquid acid into a cooling-tank N. To this liquid acid I add an amount of water or weak acid sufficient to reduce the strength of the acid in the tank N to the strength which the acid originally had in the tank G. Preferably water is added to the strong acid in that compartment of the tank L into which the acid flows over the partition F. I have shown a pipe O, through which water or weak acid may be supplied. An overflow-pipe P, preferably leading from the bottom of the tank, so as to take the cool portion of the liquid acid, is employed to convey the acid from the tank N to another tank Q, which I will term the "regulator-tank." In this tank is arranged a float R, which is operatively connected with a valve S, controlling an outlet-pipe T, leading from the tank L. The operative connection may consist of a wire U, passing over rollers V and connected with a lever W, which engages the valve-stem. A weight X keeps the wire U taut and has a tendency to open the valve S when the float rises. When, however, the float sinks, it will pull up the weight X and close the valve S. It will therefore be seen that the float will automatically maintain a predetermined level in the regulating-tank Q by opening or closing the valve S, so that the portion of strong acid which goes to the cooling-tank N will be in proper ratio to that portion of the strong acid which is discharged through the outlet T. The acid which flows through the outlet T constitutes the output or product of the plant and is received in suitable receptacles, being first passed into a cooling-tank Y of any suitable construction.

Within the regulating-tank Q is located a pump Z, preferably of the centrifugal type; but I might employ any style of pump the suction-port of which would be connected with the tank Q. This pump has a discharge-pipe $a$ leading to the supply-tank G. In the latter I arrange another float $q$, from which a wire $u$ leads over rollers $v$ to a device which controls the speed of the pump Z. In the specific instance shown this controller consists of a rheostat $b$, having electrical connections $c$ with the electric motor $d$, the shaft $e$ of which directly drives the pump Z. With this construction should the float $q$ fall the speed of the motor $d$ and of the pump Z will be increased, so as to restore the level of the liquid in the supply-tank G to its normal height. Similarly should the level of the liquid rise too high on account of the pump Z feeding too much acid the rheostat will be operated to reduce the speed of the pump.

In practice I may employ acid of, say, ninety-seven per cent. in the supply-tank G. This acid as it absorbs the anhydrid in the tower A would become heated to, say, 145° Fahrenheit and increase in strength to, say, ninety-eight per cent. The final product of the plant received at the outlet T would therefore be ninety-eight per cent. acid. The amount of water added through the pipe O would be such as to again restore the original strength of the acid—that is, ninety-seven per cent. A manually-operated valve $f$ might be provided for regulating from time to time the proportion of water admitted. The acid in the tank N will be cooled to about 100° Fahrenheit and will be brought back to the supply-tank G by the pump Z. The valve I is set manually at the beginning of the operation, but the ordinary regulation of the acid-supply to the absorption-tower is effected by the float $q$, acting in connection with the pump Z, as described. It will therefore be understood that there is practically the same body of acid circulating continuously from the absorption-tower to the cooling-tank N, the regulating-tank Q, and the supply-tank G. As this body of acid absorbs anhydrid and accordingly requires an increased strength, a portion of such strong acid is separated to form the product of the plant, while the remainder of the strong acid is again diluted, cooled, and returned to the supply-tank. I have found that this is a very economical procedure and that very little power is required to bring about the circulation of the absorbing-acid.

It will be observed that the strong acid produced in the absorption-tower is divided into two portions, one of which is separated or reserved as the final product of the process, while the other portion, which is much larger, is diluted and returned to the first stage of the process to absorb a further amount of anhydrid.

What I claim as new, and desire to secure by Letters Patent, is—

1. The herein-described method of making sulfuric acid, which consists in causing liquid sulfuric acid and gaseous sulfuric anhydrid to travel in opposite directions in contact with each other, reserving a portion of the strong acid thus produced as the final product of the process, diluting and cooling the remainder of the strong acid, and returning such diluted and cooled acid to the first stage of the process to again absorb the anhydrid.

2. The herein-described process of manufacturing sulfuric acid, which consists in causing liquid sulfuric acid and gaseous anhydrid to travel in contact with each other, reserving a portion of the strong acid thus produced as the final product of the process, diluting and cooling the remainder of such strong acid, and returning such diluted and cooled product to the first stage of the process to again absorb the anhydrid.

3. The herein-described process of making sulfuric acid, which consists in causing liquid sulfuric acid and sulfuric anhydrid to travel in contact with each other, separating a portion of the strong acid produced as the final product of the process, diluting and cooling the remainder of the strong acid, and transferring the diluted and cooled product to the first stage of the process, and utilizing the variation in the level of the diluted and cooled product for governing the proportion of the strong acid which is separated as final product.

4. The herein-described process of manufacturing sulfuric acid, which consists in causing liquid sulfuric acid and gaseous sulfuric anhydrid to travel in contact with each other, separating the strong acid produced into two portions, one of which constitutes the final product, diluting and cooling the other portion of the strong acid and then collecting the product, transferring the said collected product to the first stage of the process, and utilizing the variations in the level of the collected product to control the relative amounts of the two portions taken from the strong acid.

5. The herein-described process of making sulfuric acid, which consists in causing liquid sulfuric acid and gaseous sulfuric anhydrid to travel in contact with each other, diluting and cooling a portion of the strong acid thus produced, transferring and collecting, in readiness for a return to the first stage of the process, the diluted and cooled product thus obtained, and utilizing the variations in the level of the collected product to govern the amount of cooled, diluted acid which is transferred to the collected body.

6. The herein-described process of making sulfuric acid, which consists in causing liquid sulfuric acid and gaseous sulfuric anhydrid to travel in contact with each other, separating the resulting strong acid into two portions, one of which is the final product, diluting and cooling the other portion of the strong acid, collecting the cooled product, utilizing the variations in the level of the collected, cooled product, for governing the proportion of the two portions of the strong acid, transferring and again collecting the cooled, diluted acid, as a supply-body, in readiness to be returned to the first stage of the process, and utilizing the variations in the level of the acid about to be returned to the first stage of the process, for governing the transfer of cooled acid to such supply-body.

In testimony whereof I have signed my name to this specification in the presence of two subscribing witnesses.

JOHN B. FRANCIS HERRESHOFF.

Witnesses:
  JOHN LOTKA,
  EUGENE EBLE.